(12) United States Patent
Daunas

(10) Patent No.: US 9,091,243 B2
(45) Date of Patent: Jul. 28, 2015

(54) METHOD FOR SECURING THE OPERATION OF A VOLTAGE-HOLDING DEVICE FOR A VEHICLE

(75) Inventor: Olivier Daunas, Pontoise (FR)

(73) Assignee: PEUGEOT CITROËN AUTOMOBILES SA, Velizy Villacoublay (FR)

( * ) Notice: Subject to any disclaimer, the term of this patent is extended or adjusted under 35 U.S.C. 154(b) by 842 days.

(21) Appl. No.: 13/202,060

(22) PCT Filed: Jan. 19, 2010

(86) PCT No.: PCT/FR2010/050078
§ 371 (c)(1),
(2), (4) Date: Aug. 17, 2011

(87) PCT Pub. No.: WO2010/094869
PCT Pub. Date: Aug. 26, 2010

(65) Prior Publication Data
US 2011/0298277 A1    Dec. 8, 2011

(30) Foreign Application Priority Data

Feb. 19, 2009 (FR) ...................... 09 51076

(51) Int. Cl.
*B60R 22/00* (2006.01)
*F02P 9/00* (2006.01)
(Continued)

(52) U.S. Cl.
CPC ............. *F02N 11/0866* (2013.01); *B60L 1/00* (2013.01); *G06F 19/00* (2013.01); *H02J 7/345* (2013.01); *F02N 2011/0885* (2013.01); *F02N 2011/0888* (2013.01); *F02N 2300/302* (2013.01)

(58) Field of Classification Search
CPC ....... B60R 25/04; B60R 25/00; F02N 11/087; F02N 11/0807; F02N 11/0866; H04M 1/00; G06F 7/00; G06F 17/00; G01C 22/00

USPC ................. 307/10.6, 10.1, 64, 66, 10.2, 106; 455/556.1; 701/2, 1, 24; 340/426.35
See application file for complete search history.

(56) References Cited

U.S. PATENT DOCUMENTS 6,275,001 B1    8/2001   Dierker
7,573,151 B2 *  8/2009   Acena et al. .................. 307/9.1
(Continued)

FOREIGN PATENT DOCUMENTS

DE    102004016292 A1    10/2005
DE    102007027498 A1    1/2008
(Continued)

OTHER PUBLICATIONS

International Search Report corresponding to International Application No. PCT/FR2010/050078 mailed Jun. 4, 2010.

*Primary Examiner* — Rexford Barnie
*Assistant Examiner* — Jagdeep Dhillon
(74) *Attorney, Agent, or Firm* — Polster, Lieder, Woodruff & Lucchesi, L.C.

(57) ABSTRACT

The invention relates to a method for securing the operation of a voltage-holding device used for starting or restarting the internal combustion engine of a vehicle, the voltage-holding device being electrically connected by a multiplex network to an electric machine and to a monitoring computer. According to the method, the voltage-holding device can be activated only if it has previously received an activation authorization message, which can be a starting or restarting message, sent by the computer to the electric machine and to the voltage holding device, or a message transmitted by the electric machine indicating that it is about to restart the internal combustion engine.

16 Claims, 1 Drawing Sheet

(51) Int. Cl.
*H02G 3/00* (2006.01)
*F02N 11/08* (2006.01)
*G06F 19/00* (2011.01)
*B60L 1/00* (2006.01)
*H02J 7/34* (2006.01)

(56) References Cited

U.S. PATENT DOCUMENTS

| | | | |
|---|---|---|---|
| 7,725,129 B2* | 5/2010 | Grunhold | 455/556.1 |
| 2003/0042873 A1 | 3/2003 | Osada et al. | |
| 2004/0124811 A1 | 7/2004 | Kok et al. | |
| 2005/0025099 A1* | 2/2005 | Heath et al. | 370/334 |
| 2005/0179323 A1* | 8/2005 | Flick | 307/10.6 |
| 2006/0061458 A1* | 3/2006 | Simon et al. | 340/426.35 |
| 2008/0161981 A1* | 7/2008 | Tessier et al. | 701/2 |

FOREIGN PATENT DOCUMENTS

| | | |
|---|---|---|
| EP | 1715178 A1 | 10/2006 |
| FR | 2829308 A1 | 3/2003 |
| FR | 2853154 A1 | 10/2004 |

\* cited by examiner

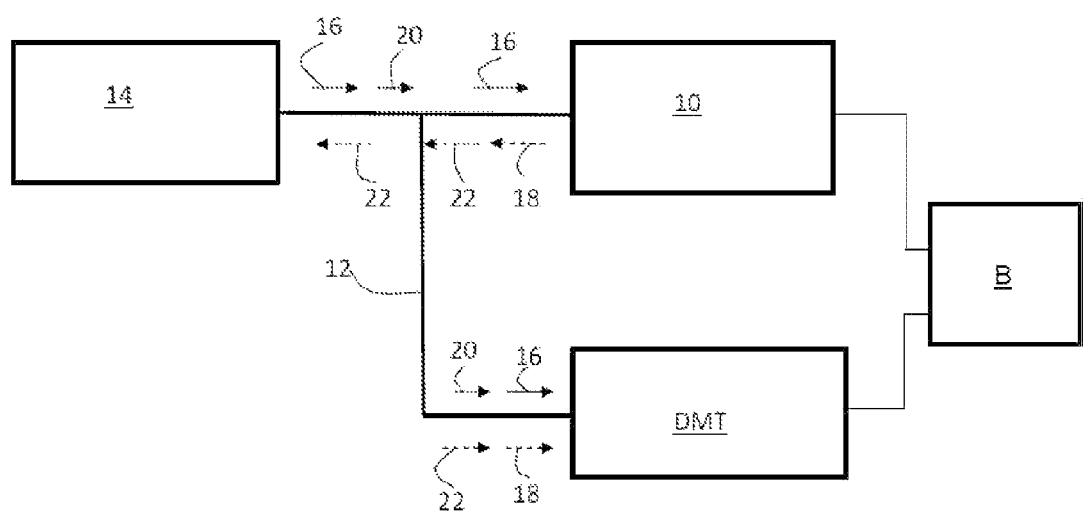

METHOD FOR SECURING THE OPERATION OF A VOLTAGE-HOLDING DEVICE FOR A VEHICLE

CROSS-REFERENCE TO RELATED APPLICATIONS

The present application is the US National Stage under 35 U.S.C. §371 of PCT/FR2010/050078 which was filed on Jan. 19, 2010 and which claims the priority of French application 0951076 filed on Feb. 19, 2009 the content of which (text, drawings and claims) is incorporated here by reference.

BACKGROUND

The present invention relates to securing the operation of voltage holding devices for on-board networks of vehicles, especially automobiles.

Electrical energy consuming accessories have a tendency of becoming more numerous in automotive vehicles. Examples of such accessories include air conditioners or power steering systems or devices for automatic stop and start of combustion engines, systems which are currently called "Stop & Start". For instance, Stop & Start systems can comprise a reversible alternator, or "alternator-starter", for restarting the combustion engine and recuperating kinetic energy when the vehicle decelerates and for transforming this energy into electrical energy used to recharge the battery.

These kind of devices, which are used to restart the combustion engine, have high energy demands, require significant electrical power, and in turn cause high electrical currents. This energy demand must be satisfied without oversizing the electrical supply means and without provoking a voltage drop in the on-board network, which would result in a perception of poor vehicle quality and a temporary reduction of the engine torque.

To resolve these problems, it has been proposed to add an auxiliary energy source, such as a second battery connected to the on-board network. This solution however is relatively costly and requires space under the hood or in the trunk of the vehicle.

Another solution consists in adding to the network secondary means for storing electrical energy, such as high performance capacitors (for instance 300 F capacitors). This solution can be used in addition to the traditional 12V battery for starting and restarting and for powering the electricity-consuming accessories connected to the network. The high capacitance of these capacitors however causes difficult to avoid inconveniences, for instance Joule effect heating of the electrical conductors.

Patent application FR 2 853 154 filed on Mar. 27, 2003 proposes a "DMT" type (Voltage Holding Device or "DMTC" Centralized Voltage Holding Device) supply system of electrical energy for stabilizing the voltage of the on-board network. These electrical voltage holding devices appear to be almost indispensable when the vehicle is equipped with a Stop & Start system.

The voltage holding device, used during the restart phases of the combustion engine, must be activated and deactivated rapidly in order to avoid voltage surges or drops in the on-board network. For instance, the overvoltage provided by the secondary energy storage means, such as super-capacitors, at the moment the engine is restarted, can be in the order of 4 to 5 Volts in addition to the 12V supplied by the battery. Of course, this overvoltage must be suppressed rapidly when the restart phase is terminated, at the risk of damaging electrical devices that do not tolerate a voltage on the order of 12 Volt plus 4 or 5 Volt. Therefore, the voltage holding device must contribute energy only when necessary.

BRIEF SUMMARY

Briefly, a method is disclosed to secure the windows where the DMTC is susceptible of being activated (a specific voltage condition for instance). This will prevent the DMTC from activating in an untimely manner outside these windows. These windows are the start and restart phases.

More precisely, a method is disclosed for securing the operation of a voltage holding device (DMT) used for starting or restarting the combustion engine of a vehicle, whereby the device is electrically connected through the on-board network to an electrical machine and a processor. According to the method, the voltage holding device can only be activated after receiving a message authorizing its activation.

This message may be a start or restart message sent by the processor to the electrical machine and to the voltage holding device or a message sent by said electrical machine advising that the combustion engine will be restarted.

The processor can send a message stopping the start or restart of the motor, which has the effect of deactivating the voltage holding device DMT.

The electrical machine can also send a message indicating the stop of the start or restart, which has the effect of deactivating the voltage holding device DMT.

BRIEF DESCRIPTION OF THE SEVERAL VIEWS OF THE DRAWINGS

Other advantages and characteristics of the invention will appear in the following description of an implementation mode of the invention, provided as a non-limiting example, with reference to the attached drawings in which the FIGURE schematically illustrates the method of the invention.

DETAILED DESCRIPTION

In the FIGURE, a voltage holding device (DMT) is electrically connected to an electrical machine 10 through the on-board network 12 of an automotive vehicle. The vehicle comprises in the traditional manner a battery B (usually a 12 Volt battery) connected to the electrical machine 10 and to the voltage holding device DMT. The electrical machine 10 can be, for instance, an alternator-starter when the vehicle is equipped with an automatic start and stop system for the combustion engine of the vehicle (Stop & Start system) or simply a starter for starting the engine. The voltage holding device DMT can comprise, for instance, super-capacitors and a DC/DC converter. During the start or restart phases of the combustion engine, the super-capacitors are connected in series with the battery of the vehicle in order to supply the supplementary electrical power required by the electrical machine 10 in order to produce the high mechanical torque needed for starting or restarting of the engine. Outside these start or restart phases, the super-capacitors are connected in parallel to the battery in order to recharge through the DC/DC converter.

The multiplexed network 12 can be a normalized network, for instance, a CAN, LIN or FlexRay type network.

A processor 14, for example the processor controlling the operation of the combustion engine, controls the operation of the electrical machine 10 and the voltage holding device DMT. When the electrical machine and/or the voltage holding device DMT comprise a processor, the processor 14 can be replaced by the processor(s) of the electrical machine 10 and/or the voltage holding device DMT. When it is necessary to start or restart the engine, the processor 14 requests the start or restart by sending an activation authorization message 16 to the machine 10 and to the voltage holding device DMT through the intermediary of network 12. This authorization message 16 can be an actual command to start or restart or a request to prepare the electrical machine for start or restart. For instance, the request to prepare the electrical machine for start or restart can correspond, in the case of an alternator-starter, with pre-fluxing of the rotor, by sending a current through the rotor circuit in order to magnetize it.

The electrical machine 10 can indicate that it is about to restart, if it possess information that is not known to processor 14. In this case, the electrical machine sends an activation authorization message 18 through network 12 to processor 14 and the voltage holding device DMT.

Upon receiving an activation authorization message 16 or 18, the voltage holding device DMT can be activated, on the condition that its conditions for activating are validated. For instance, the voltage holding device DMT can monitor the current flowing through it: when the vehicle stops, the voltage holding device DMT sees all of the current circulating through the on-board network. If there is a start or restart request, the electrical current passing through the voltage holding device DMT increases and if this current is greater than a predetermined threshold, the voltage holding device DMT will connect the super-capacitors in series with the battery; in the opposite case, the super capacitors are not connected. The reception of an activation authorization signal by the voltage holding device DMT does not mean that it must activate, but that it may be activated (in general under reservation that other conditions are satisfied).

The voltage holding device DMT is therefore authorized to activate, either upon receiving a command from the supervisory processor 14 authorizing start or restart, or upon receiving a status from the electrical machine 10 indicating start or restart.

Inversely, the processor 14 can send a message 20 stopping the start or restart of the engine, or the electrical machine can send a message 22 indicating the stop of start or restart. These messages correspond with interdiction messages for the activation of the voltage holding device DMT which have the effect of deactivating the voltage holding device DMT (interdiction to connect the super-capacitors in series with the battery).

In accordance with the method, the voltage holding device DMT is authorized to activate only during the temporary window in which the electrical machine is authorized to start or restart. This prevents the untimely connection in series of the voltage holding device DMT with the battery during the phases that the battery voltage is nominal. This untimely triggering, causing overvoltage, can have as a consequence a reduction of the battery life or even destruction of the battery, and possibly of the on-board network and/or the accessories connected to the network. The invention therefore secures the connection in series of the voltage holding device DMT with the battery and its operation.

Other implementation modes than those described and shown can be conceived by a person skilled in the art without falling outside the scope of the present invention.

The invention claimed is:

1. A method for securing the operation of a voltage holding device used for starting or restarting of an internal combustion engine of a vehicle, whereby said vehicle comprises a battery separate from said voltage holding device, and said voltage holding device comprising at least one super-capacitor; said voltage holding device being electrically connected through an onboard electrical network to an electrical machine and a processor, and said battery being electrically connected to said voltage holding device and said electric machine; the method comprising (1) said voltage holding device receiving an activation authorization message; and (2) activating said voltage holding device only after said voltage holding device receives said activation authorization message; whereby the battery and voltage holding device are normally connected in parallel; however, upon receipt of an activation signal, if the current flowing through the voltage holding device exceeds a predetermined threshold, the voltage holding device places the at least one super-capacitor in series with said battery.

2. The method according to claim 1 wherein said activation authorization message is a start or restart message sent by the processor to said electrical machine and said voltage holding device.

3. The method according to claim 1 wherein said activation authorization message is a message sent by said electrical machine indicating that it is about to start said internal combustion engine.

4. The method according to claim 1 wherein said processor sends a message to stop the start or restart of said engine which has the effect of deactivating the voltage holding device.

5. The method according to claim 1 wherein the electrical machine sends a message indicating the stop of the start or restart which has the effect of deactivating the voltage holding device.

6. The method of claim 1 wherein said step of activating said voltage holding device comprises activating said voltage holding device only if conditions for activating are validated.

7. The method of claim 6 further including a step of monitoring the current passing through the voltage holding device, and after receipt of an activation authorization message, activating the voltage holding device if the current is greater than a predetermined threshold.

8. A method for securing the operation of a voltage holding device used for starting or restarting of an internal combustion engine of a vehicle, whereby said voltage holding device is electrically connected through an onboard electrical network to an electrical machine and a processor; the vehicle further including an electrical machine and a battery separate from the voltage holding device, the battery being electrically connected to the voltage holding device and the electric machine; the battery and voltage holding device normally being connected in parallel, the method comprising:
   (1) sending an activation authorization message to said voltage holding device from one of said processor and said electrical machine;
   (2) activating said voltage holding device only after said voltage holding device receives said activation authorization message
   (3) monitoring the current flowing through the voltage holding device upon activation of the voltage holding device; and
   (4) placing the voltage holding device in series with the battery if the current flowing through the voltage holding device exceeds a predetermined threshold.

9. The method according to claim 8 wherein said activation authorization message is sent by the processor to said electrical machine as well as said voltage holding device; said activation authorization message being a start or restart message.

10. The method according to claim 8 wherein said activation authorization message is sent by said electrical machine;

said activation authorization message being a message that said electrical machine is about to start said internal combustion engine.

11. The method according to claim 8 where said electrical machine is an alternator-starter which is electrically connected to an automatic start and stop system.

12. The method according to claim 8 wherein said activating said voltage holding device comprises connecting said voltage holding device in series with a battery.

13. A system for securing the operation of a voltage holding device used for starting or restarting of an internal combustion engine of a vehicle, the system comprising:
  a voltage holding device which is electrically connected directly or indirectly to an alternator-starter which in turn is electrically connected to an automatic start and stop system,
  a battery electrically connected to the alternator-starter and the voltage holding device; the battery being normally connected in parallel with the voltage holding device;
  the voltage holding device and the alternator-starter also being electrically connected to a processor; wherein said processor and said alternator-starter are configured to have the capacity to send an activation authorization message to said voltage holding device and said voltage holding device is configured to be activated only after receiving said activation authorization message; and
  said system being adapted to place said voltage holding device in series with said battery if, upon receipt of said activation signal, the current in the voltage holding device exceeds a predetermined threshold.

14. The system according to claim 13 wherein said processor is configured to send said activation authorization message to said alternator-starter as well as said voltage holding device; said activation authorization message being a start or restart message.

15. The system according to claim 13 wherein said alternator-starter is configured to send said activation authorization message; said activation authorization message being a message that said alternator-starter is about to start said internal combustion engine.

16. The system according to claim 13 wherein said voltage holding device is configured to be activated by connection in series with a battery.

* * * * *